United States Patent
Wendling et al.

(10) Patent No.: US 8,235,459 B2
(45) Date of Patent: Aug. 7, 2012

(54) SEAT SUPPORT ASSEMBLY

(75) Inventors: Eric C. Wendling, Columbus, OH (US);
Paul T. Aebker, Dublin, OH (US);
Hiroaki Taniguchi, Dublin, OH (US);
Grey B. Parker, Columbus, OH (US);
Kelly M. Whalen, Lewis Center, OH (US); Eric D. Daume, Dublin, OH (US)

(73) Assignee: Honda Motor Co., Ltd.., Toyko (JP)

( * ) Notice: Subject to any disclaimer, the term of this patent is extended or adjusted under 35 U.S.C. 154(b) by 255 days.

(21) Appl. No.: 12/755,878

(22) Filed: Apr. 7, 2010

(65) Prior Publication Data
US 2011/0248522 A1   Oct. 13, 2011

(51) Int. Cl.
*B60N 2/005* (2006.01)
(52) U.S. Cl. .......... 296/193.07; 296/187.02; 296/193.02
(58) Field of Classification Search ............... 296/64, 296/187.02, 187.03, 187.08, 187.12, 193.02, 296/193.07, 203.03, 204, 209
See application file for complete search history.

(56) References Cited

U.S. PATENT DOCUMENTS

| | | | |
|---|---|---|---|
| 5,000,509 A * | 3/1991 | Sinnhuber et al. | 296/187.12 |
| 5,362,120 A * | 11/1994 | Cornille, Jr. | 296/203.01 |
| 5,464,266 A * | 11/1995 | Guertler | 296/187.12 |
| 6,065,795 A | 5/2000 | Forster et al. | |
| 6,073,991 A * | 6/2000 | Naert | 296/187.02 |
| 6,467,834 B1 * | 10/2002 | Barz et al. | 296/187.02 |
| 6,474,722 B2 * | 11/2002 | Barz | 296/187.02 |
| 6,568,745 B2 * | 5/2003 | Kosuge et al. | 296/193.02 |
| 6,595,581 B2 * | 7/2003 | Wolkersdorfer et al. | 296/204 |
| 6,698,819 B1 * | 3/2004 | Mozer et al. | 296/187.03 |
| 6,752,450 B2 * | 6/2004 | Carroll et al. | 296/187.03 |
| 7,077,460 B2 * | 7/2006 | Czaplicki et al. | 296/187.02 |
| 7,237,833 B1 * | 7/2007 | Moll | 296/204 |
| 7,300,099 B2 * | 11/2007 | Godfrey et al. | 296/187.12 |
| 7,380,874 B2 | 6/2008 | Ito et al. | |
| 7,434,871 B2 * | 10/2008 | Mizuma et al. | 296/193.07 |
| 7,614,683 B2 | 11/2009 | Roccato et al. | |
| 7,644,978 B2 | 1/2010 | Tosaka et al. | |
| 7,648,194 B2 * | 1/2010 | Hirasawa et al. | 296/203.03 |
| 7,753,437 B2 * | 7/2010 | Klimek | 296/187.08 |
| 7,762,620 B2 * | 7/2010 | Yao | 296/187.12 |
| 8,016,340 B2 * | 9/2011 | Takakura et al. | 296/39.3 |
| 8,096,610 B2 * | 1/2012 | Ganti et al. | 296/193.02 |
| 2004/0084937 A1 | 5/2004 | Berta | |
| 2007/0052260 A1 * | 3/2007 | Lassl et al. | 296/187.12 |
| 2007/0152474 A1 * | 7/2007 | Lassl et al. | 296/187.12 |

(Continued)

FOREIGN PATENT DOCUMENTS

JP    60092938  A  *  5/1985

(Continued)

*Primary Examiner* — Glenn Dayoan
*Assistant Examiner* — Paul Chenevert
(74) *Attorney, Agent, or Firm* — Rankin, Hill & Clark LLP

(57) ABSTRACT

A seat support assembly for supporting a vehicle seat on a floor panel member includes a cross member extending laterally across the floor panel member. Ends of the cross member are spaced laterally inward relative to side edges of the floor panel for providing ingress/egress areas between the ends and the side edges. A foam spacer member is complementarily received inside each of the ends of the cross member. Each of the foam spacer members is secured to the floor panel for transferring load forces from the cross member to the floor panel.

20 Claims, 4 Drawing Sheets

U.S. PATENT DOCUMENTS

| | | | |
|---|---|---|---|
| 2008/0012384 A1* | 1/2008 | Sielhorst et al. | 296/146.7 |
| 2009/0146472 A1 | 6/2009 | Galbreath et al. | |
| 2009/0174224 A1* | 7/2009 | Takakura et al. | 296/193.07 |
| 2010/0013268 A1 | 1/2010 | Roccato et al. | |
| 2010/0078967 A1* | 4/2010 | Boettcher | 296/193.07 |
| 2011/0001337 A1* | 1/2011 | Patschicke et al. | 296/193.07 |

FOREIGN PATENT DOCUMENTS

| | | | |
|---|---|---|---|
| JP | 63116944 A | * | 5/1988 |
| JP | 03032989 A | * | 2/1991 |
| JP | 03032990 A | * | 2/1991 |
| JP | 06166384 A | * | 6/1994 |

* cited by examiner

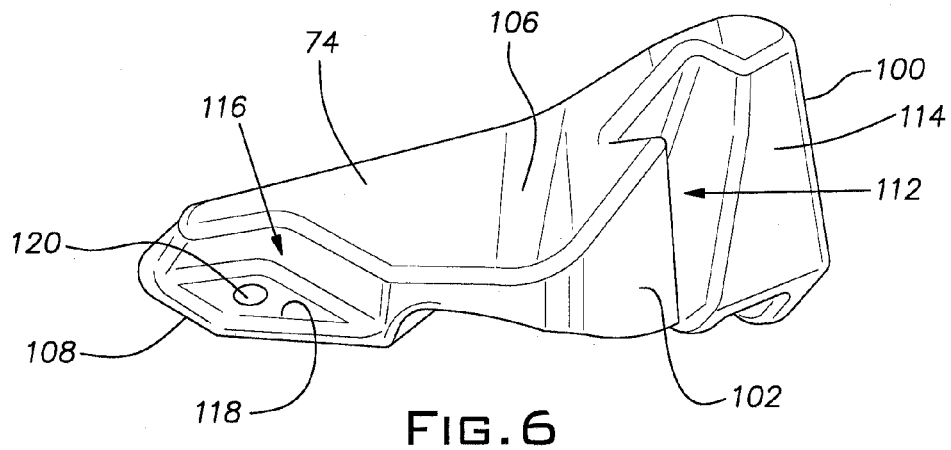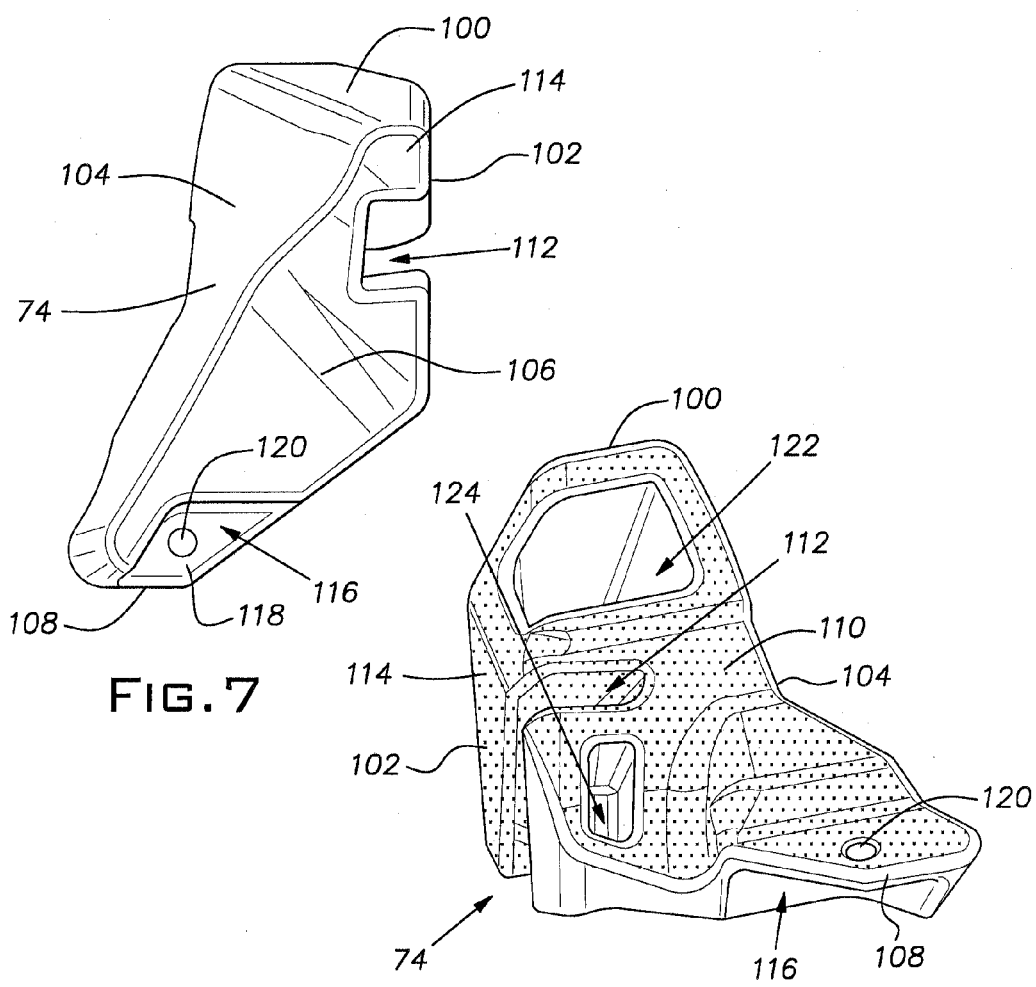

SEAT SUPPORT ASSEMBLY

BACKGROUND

The present disclosure generally relates to a seat support assembly, and more particularly relates to a seat support assembly having a spacer member complementarily received in a laterally extending cross member.

The forward edge portion of a vehicle seat is sometimes supported on a laterally extending cross member, which can be formed of a stamped steel construction. Outer lateral ends of the cross member (or members) typically extend to longitudinally extending sill members and are sometimes directly connected to the longitudinally extending sill members. While these laterally extending cross members can provide adequate anti-submarining and cushion support to the supported vehicle seat, there can be a lack of foot space for ingress/egress adjacent the supported vehicle seat, particularly when the supported vehicle seat is in the rear of a vehicle (e.g., a second row vehicle seat).

SUMMARY

According to one aspect, a seat support assembly for supporting a vehicle seat on a floor panel member includes a cross member extending laterally across the floor panel member. Ends of the cross member are spaced laterally inward relative to side edges of the floor panel for providing ingress/egress areas between the ends and the side edges. A foam spacer member is complementarily received inside each of the ends of the cross member. Each of the foam spacer members is secured to the floor panel for transferring load forces from the cross member to the floor panel.

According to another aspect, a seat support assembly for a vehicle includes a cross member, a first foam spacer member and a second foam spacer member. The cross member extends laterally across the vehicle and has a first end and a second end. The first foam spacer member is slidably received inside the first end of the cross member and the second foam spacer member is slidably received inside the second end of the cross member.

According to still another aspect, a foam spacer for a seat support assembly in a vehicle includes a foam spacer member complementarily received in a laterally extending cross member of the seat support assembly. The foam spacer member is secured to a floor panel of the vehicle to transfer load forces from the cross member to the floor panel. An outer lateral side of the foam spacer member is spaced apart from an adjacent side edge of the floor panel to define an ingress/egress area laterally between the outer lateral side of the foam spacer member and the side edge of the floor panel.

BRIEF DESCRIPTION OF THE DRAWINGS

FIG. 6 is an inside perspective view of one of the spacer members.

FIG. 7 is a top perspective view of the spacer member of FIG. 6.

FIG. 8 is an underside perspective view of the spacer member of FIG. 6.

DETAILED DESCRIPTION

Figure 1:
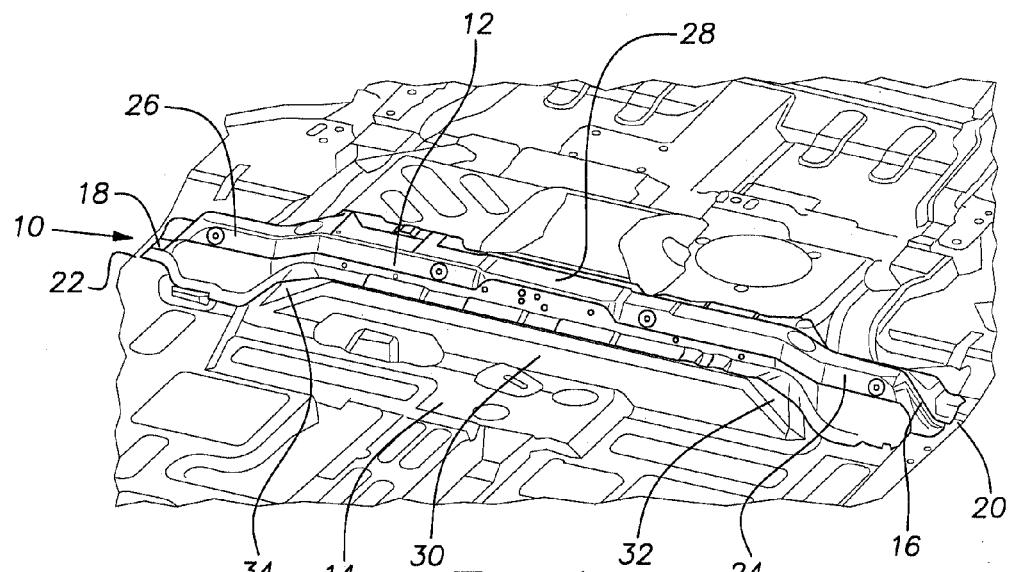
FIG. 1 is a partial perspective view of a prior art cross member extending laterally across a floor panel member from a first side edge of the floor panel member to a second side edge of the floor panel member.

Referring now to the drawings, wherein the showings are for purposes of illustrating one or more exemplary embodiments and not for purposes of limiting same, FIG. 1 shows a known prior art seat support assembly 10 including a cross member 12 extending laterally across a floor panel member 14. The cross member 12 of this known seat support assembly 10 can be formed as a stamped steel member and together with the floor panel member 14 provides anti-submarining and cushion support to a vehicle seat supported by the cross-member 12. In particular, though not shown, a forward portion of a vehicle seat would be supported by the cross member 12.

Ends 16, 18 of the cross member are disposed immediately adjacent side edges 20, 22 of the floor panel member 14. More particularly, the ends 16, 18 of the cross member 12 are formed on flanking portions 24, 26 of the cross member 12. The flanking portions 24, 26 extend laterally outwardly and downwardly relative to a main elongated portion 28 of the cross member 12. As shown, the main elongated portion 28 is received on a raised portion 30 of the floor panel member 14 and the flanking portions 24, 26 extend downward along raised side surfaces 32, 34 of the floor panel member 14. The flanking portions 24, 26 substantially fill a lateral area disposed between the raised side surfaces 32, 34 and the side edges 20, 22 of the floor panel member 14.

In some vehicles, this creates a problem in that there is insufficient foot space disposed laterally outwardly of the seat supported by the support member 12 for ingress/egress thereto. In particular, the cross member 12 extends along nearly or substantially an entire lateral extent of the floor panel 14 and thus of the width of the vehicle, including extending beyond a width of the rear seat that is supported by the support assembly 10. Unfortunately, simply shortening the cross member 12 to match the rear seat width is not an adequate solution for providing more ingress/egress space as such a shortened cross member would not provide sufficient anti-submarining and/or cushion support. Another option is to extend a rear seat cushion of the seat down to meet the floor panel 14, such as by using the urethane foam of the seat cushion to extend down to the floor panel 14. However, while this option would improve the ingress/egress condition, inadequate support would be provided to the seat as well as unnecessary added weight.

Figure 2:
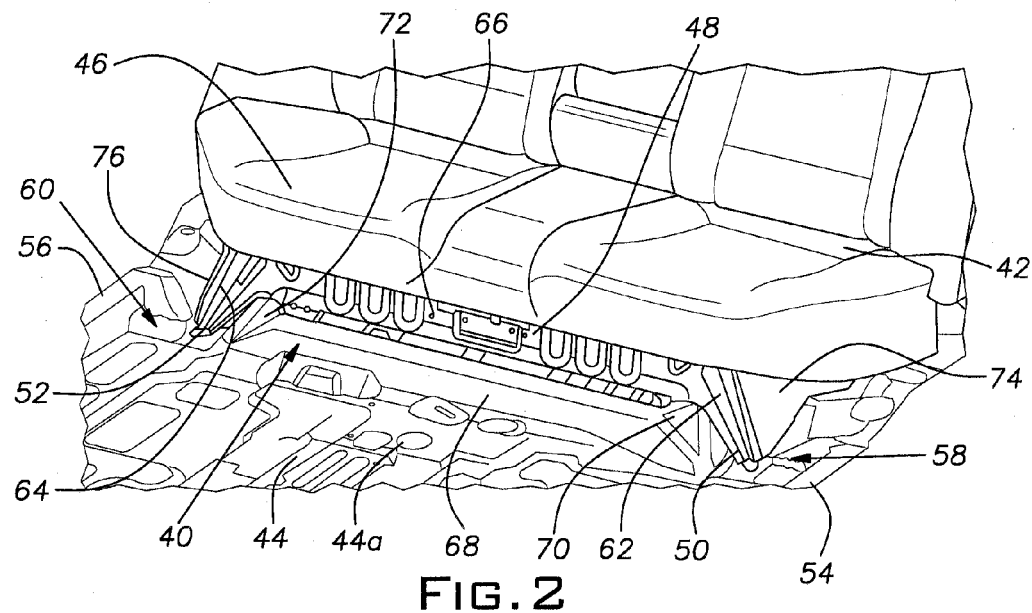
FIG. 2 is a perspective view of an improved seat support assembly supporting a vehicle seat on a floor panel member, the assembly including a cross member with spacer members received inside ends of the cross member.

With reference to FIG. 2, an improved seat support assembly 40 is illustrated for supporting a vehicle seat 42 on a floor panel member 44 while providing improved ingress/egress space laterally outside a seat cushion 46 of the vehicle seat 42. The seat support assembly 40 includes a cross member 48 extending laterally across the vehicle in which the seat support assembly 40 is installed, and more particularly extends laterally across the floor panel member 44. The cross member 48 has a first end 50 and a second end 52. The cross member 48 overlays a ramped portion 68 of the floor panel member 44 and supports a forward portion of the vehicle seat 42, particularly of the seat cushion 46 of the vehicle seat 42. As will be described in more detail below, these ends 50, 52 of the cross member 48 are spaced laterally inward relative to side edges 54, 56 of the floor panel member 44 for providing ingress/egress areas 58, 60 between the ends 50, 52 and the side edges 54, 56, respectively.

In the illustrated embodiment, the floor panel member 44 has an upper surface 44a over which the cross member 48 is disposed. The floor panel member 44 also has the first side edge 54 that is adjacent and spaced apart from the first end 50 of the cross member 48 and the second side edge 56 that is adjacent and spaced apart from the second 52 of the cross member 48. In the illustrated embodiment, the first and second ends 50, 52 of the cross member 48 include flanking portions 62, 64 that extend laterally outwardly and downwardly relative to a main elongated portion 66 of the cross member 48. In particular, the main elongated portion 66 is received on [[a]] the raised ramped portion 68 of the floor panel member 44 and the flanking portions 62, 64 extend downward along raised side surfaces 70, 72 of the raised portion 68 of the floor panel member 44.

The seat support assembly 40 can additionally include first and second spacer members 74, 76. The first spacer member 74 is slidably received inside the first end 50 of the cross member 48 and the second spacer member 76 (only a small portion shown in FIG. 2) is slidably received inside the second end 52 of the cross member 48. The first and second spacer members 74, 76 each extend substantially longitudinally rearwardly from the cross member 48. As will be described in more detail below, the first and second foam spacer members 74, 76 each include a laterally extending portion received in the cross member 48 and a mounting portion spaced longitudinally rearwardly of the cross member 48.

Figure 3:
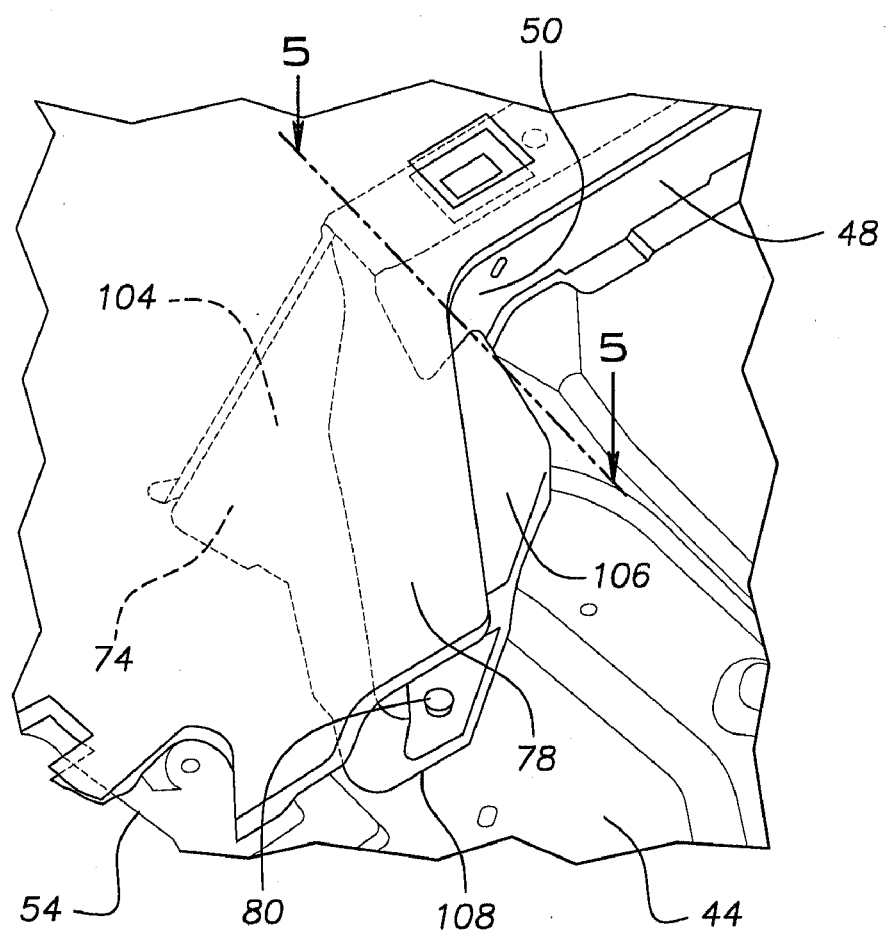
FIG. 3 is a partial perspective view of one of the spacer members complementarily received inside an end of a cross member.
Figure 4:
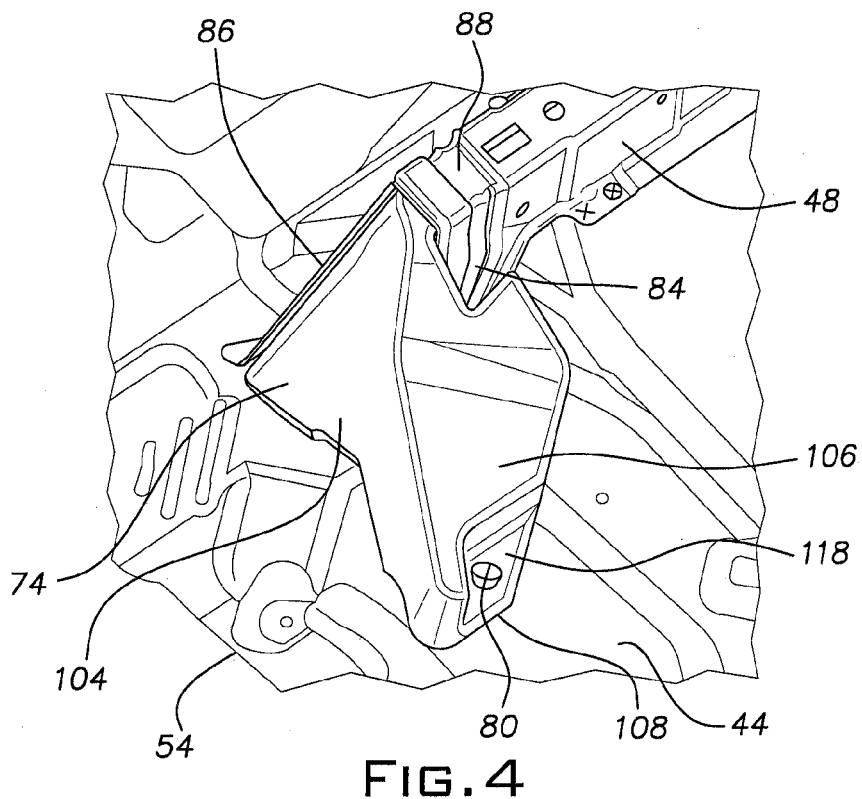
FIG. 4 is a partial perspective view similar to FIG. 3, but shown with a carpet removed.

The first and second spacer members 74, 76 can be mirrored relative to one another and likewise the slidable engagement of the first and second spacer members 74, 76 with the respective first and second ends 50, 52 of the cross member 48 can be mirrored. Accordingly, only the first spacer member 74 and its engagement with the first end 50 of the cross member 48 will be described in further detail herein, though it is to be appreciated that all such details are applicable to the second spacer member 76 and its engagement with the second end 52. With additional reference to FIGS. 3 and 4, the spacer member 74 is shown complementarily received inside the first end 50 of the cross member 48. In FIG. 3, a carpet or carpet member 78 is shown overlaid onto the cross member 48 and the spacer member 74. In FIG. 4, the cross member 48 and the spacer member 74 are shown with the carpet 78 removed. The spacer member 74 is secured to the floor panel member 44, such as by the illustrated trim clip or fastener 80, for transferring load forces from the cross member 48 through the spacer member 74 and to the floor panel member 44.

Figure 5:
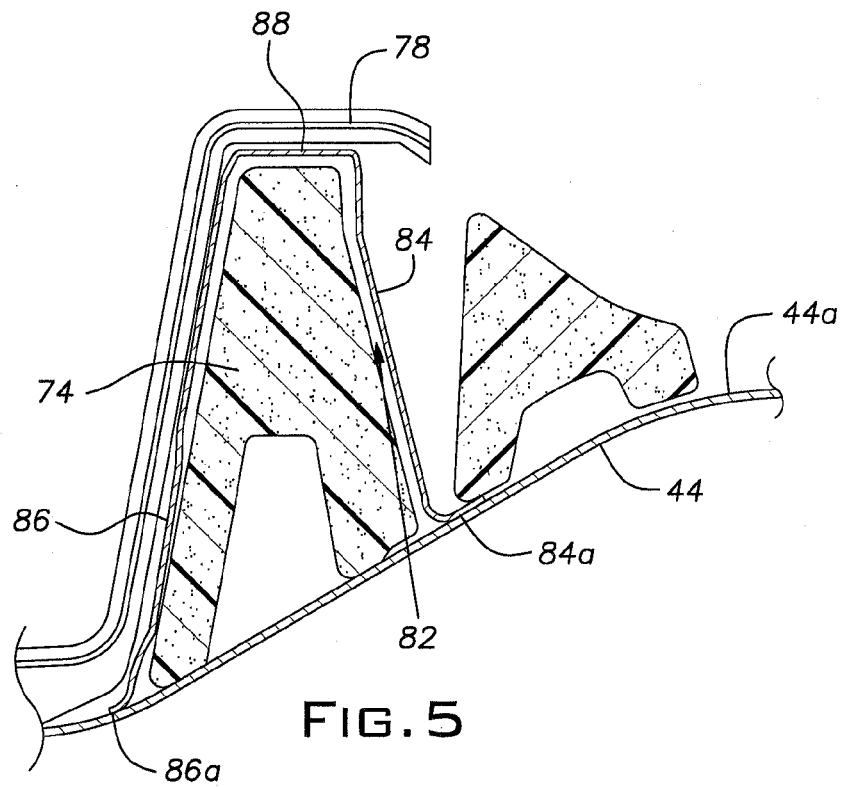
FIG. 5 is a partial cross-sectional view taken along the line 5-5 of FIG. 3.

With additional reference to FIG. 5, the cross member 48, and particularly the end 50, has a U-shape and the spacer member 70 is slidably received in a pocket 82 formed by the U-shape. In particular, the cross member 48 has an inverted U-shape including spaced apart leg portions 84, 86 and a base portion 88 extending between the leg portions 84, 86. The leg portions 84, 86 are secured to the upper surface 44a of the floor panel member 44. More specifically, the leg portions 84, 86 can include respective flange portions 84a, 86a that are secured to the floor panel member 44, such as by welding.

With reference to FIGS. 6-8, the spacer member 74 is shown in isolation from the seat support assembly 40. As illustrated, the spacer member 74 has a forward side 100, inner and outer lateral sides 102, 104 extending from the forward side 100 and an upper side 106 sloping downward from an upper end of the forward wall 100 to a rearward edge 108 of the spacer member 74. A lower side 110 extends from the forward side 100 to the rearward edge 108 and between the inner and outer lateral sides 102, 104. A recess 112 is defined in the inner lateral side 102. The recess 112 extends from the upper surface 106 to the lower surface 110. The spacer member 74 has a laterally extending portion 114 defined by the recess 112.

If desired, the spacer member 74 can have one or more underside recesses defined therein. In the illustrated embodiment, with reference to FIG. 8, the spacer member 74 includes a first underside recess 122 defined adjacent the forward side 100 and partially into the laterally extending portion 114, and a second underside recess 124 defined in the lower surface 110 on an opposite side of the recess 112 as the first underside recess 122.

The spacer member 74 can be formed of a rigid foam material. More particularly, in one embodiment, the spacer member 74 is formed of expanded polypropylene. This material provides suitable rigidity to the spacer member 74, while maintaining the spacer member 74 as a relatively lightweight member. As shown in FIG. 8, the lower side of the spacer member 74 can include a dot treatment for reducing noise generated by engagement of the foam spacer member 74 with the floor panel member 44. Specifically, the dot treatment can reduce squeaking caused by relative movement and engagement between the spacer member 74 and the floor panel member 44.

The upper side 106 of the spacer member 74 can include a recess or recessed portion 116 adjacent the rearward edge 108 defining a recessed surface 118. As shown, the recessed surface 118 can define an aperture 120 for receiving a fastener, such as fastener 80 shown in FIGS. 2 and 3, that secures the spacer member 74 to the floor panel member 44.

When assembled in the seat support assembly 40, the cross member 48 can first be secured to the floor panel member 44, such as by welding. Then, the foam spacer member 74 can have its laterally extending portion 114 slidably and complimentarily received inside a corresponding one of the ends (e.g., end 50) of the cross member 48. As best shown in FIG. 5, the laterally extending portion 114 has a profile that complementarily matches a profile of the cross member 48 at the end 50. In particular, the laterally extending portion 114 of the spacer member 74 can have a generally isosceles trapezoidal shape. To complete the installation, the trim clip 80 can be received through the aperture 120 and into an aperture (not shown) in the floor panel member 44.

When the laterally extending portion 114 is received within the end 50 of the cross member 48, forward leg 86 of the cross member 48 overlaps the forward side 100 of the spacer member 74. Rearward leg 84 of the cross member 48 is received in the recess 112 defined in the inner lateral side 102 of the spacer member 74 and the base 88 overlaps the upper side 106, particularly a portion of the upper side 106 disposed forwardly of the recess 112, of the spacer member 74. In this orientation, the forward side 100 of the spacer member 74 is disposed substantially laterally relative to the floor panel member 44 (i.e., substantially parallel to the laterally extending cross member 48) and the inner and outer lateral sides 102, 104 extend substantially longitudinally rearwardly from the forward side 100. As such, the mounting portion (i.e., the recess 116 and recessed surface 118 defining the aperture 120) is spaced longitudinally rearwardly of the cross member 48. The forward leg 86 of the cross member 48 overlaps substantially and entirety of the forward wall 100 of the spacer member 74 to provide an improved aesthetic appearance.

Advantageously, as shown in FIGS. 2, 3 and 4, the outer lateral side 104 of the spacer member 74 is spaced apart from the adjacent side edge 54 of the floor panel member 44 thereby defining the ingress/egress area 58 laterally between the outer lateral side 104 of the spacer member 74 and the side edge 54 of the floor panel member 44. This arrangement still provides adequate support to the seat cushion 46 and anti-submarining characteristics, while being relatively easily assembled and with minimum weight impact.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A seat support assembly for a vehicle, comprising:
   a cross member extending laterally across the vehicle, the cross member having a first end and a second end;
   a first spacer member slidably received inside said first end of said cross member; and
   a second spacer member slidably received inside said second end of said cross member,
   wherein said first and second spacer members each extend substantially longitudinally rearwardly from said cross member.

2. A seat support assembly for a vehicle, comprising:
   a cross member extending laterally across the vehicle, the cross member having a first end and a second end;
   a first spacer member slidably received inside said first end of said cross member; and
   a second spacer member slidably received inside said second end of said cross member, wherein said first and second spacer members each include a laterally extending portion received in said cross member and a mounting portion spaced longitudinally rearwardly of said cross member, said mounting portion defining a mounting aperture.

3. The seat support assembly of claim 2 wherein the first and second spacer members are formed of a rigid foam material.

4. The seat support assembly of claim 2 further including:
   a floor panel member having an upper surface over which said cross member is disposed, said floor panel member having a first side edge adjacent and spaced apart from said first end of said cross member with a first vacant ingress/egress area defined therebetween and a second side edge adjacent and spaced apart from said second end of said cross member with a second vacant ingress/egress area defined therebetween.

5. The seat support assembly of claim 4 wherein said first and second ends of said cross member include flanking portions that extend laterally outwardly and downwardly relative to a main elongated portion of said cross member.

6. The seat support assembly of claim 5 wherein said main elongated portion of said cross member is received on a raised portion of said floor panel member and said flanking portions extend downward along raised side surfaces of said raised portion of said floor panel member.

7. A foam spacer member for seat support assembly in a vehicle,
   wherein said foam spacer member is complementarily received in a laterally extending cross member of the seat support assembly, said foam spacer member is secured to a floor panel of the vehicle to transfer loads forces from the cross member to the floor panel, and an outer lateral side of said foam spacer member is spaced apart from an adjacent side edge of the floor panel to define an ingress/egress area laterally between said outer lateral side of the foam spacer member and the side edge of the floor panel.

8. A seat support assembly for supporting a vehicle seat on a floor panel member, comprising:
   a cross member extending laterally across the floor panel member, ends of said cross member spaced laterally inward relative to side edges of the floor panel member for providing ingress/egress areas between said ends and the side edges;
   a foam spacer member complementarily received inside each of said ends of said cross member, each of said foam spacer members secured to the floor panel member for transferring load forces from said cross member to the floor panel member,
   wherein said cross member overlays a ramped portion of the floor panel member and supports a forward portion of the vehicle seat.

9. A seat support assembly for supporting a vehicle seat on a floor panel member, comprising:
   a cross member extending laterally across the floor panel member, ends of said cross member spaced laterally inward relative to side edges of the floor panel member for providing ingress/egress areas between said ends and the side edges;
   a foam spacer member complementarily received inside each of said ends of said cross member, each of said foam spacer members secured to the floor panel member for transferring load forces from said cross member to the floor panel member,
   wherein said foam spacer member has a forward side disposed substantially laterally relative to the floor panel member, inner and outer lateral sides extending substantially longitudinally rearwardly from the forward side and an upper side sloping downward from the forward wall to a rearward edge of said spacer member.

10. The seat support assembly of claim 9 wherein each of said ends of said cross member has a forward leg, a rearward leg and a base, said forward leg overlapping said forward side of said foam spacer member, said rearward leg received in a recess defined in said inner lateral side of said foam spacer member and said base overlapping said upper side of said foam spacer member.

11. The seat support assembly of claim 10 wherein said forward leg overlaps substantially an entirety of said forward wall of said foam spacer member.

12. The seat support assembly of claim 10 wherein said upper side includes a recess adjacent said rearward edge defining a recessed surface, said recessed surface defining an aperture for receiving a fastener to secure said foam spacer member to the floor panel member.

13. A seat support assembly for supporting a vehicle seat on a floor panel member, comprising:
   a cross member extending laterally across the floor panel member, ends of said cross member spaced laterally inward relative to side edges of the floor panel member, vacant ingress/egress areas defined between said ends of said cross member and the side edges of the floor panel member;
   a foam spacer member complementarily received inside each of said ends of said cross member, each of said foam spacer members adjacent a respective one of said vacant ingress/egress areas and secured to the floor panel member for transferring load forces from said cross member to the floor panel member.

14. The seat support assembly of claim 13 wherein a lower side of said foam spacer member includes a dot treatment for reducing noise generated by engagement of said foam spacer member with the floor panel member.

15. The seat support assembly of claim 13 wherein said foam spacer member is formed of expanded polypropylene.

16. The seat support assembly of claim 13 wherein each of said ends of said cross member has a U-shape and said foam spacer member is slidably received in a pocket formed by said U-shape.

17. The seat support assembly of claim 16 wherein said cross member has an inverted U-shape including spaced apart leg portions and a base portion, said leg portions secured to an upper surface of the floor panel member.

18. The seat support assembly of claim 13 wherein each foam spacer member has a laterally extending portion that is received inside a corresponding one of said ends of said cross member, said laterally extending portion having a profile that complementarily matches a profile of said cross member at each of said ends.

19. The seat support assembly of claim 18 wherein said laterally extending portion of said foam spacer member is a generally isosceles trapezoidal shape.

20. The seat support assembly of claim 18 wherein said foam spacer member includes at least one underside recess defined therein.

* * * * *